United States Patent Office 2,898,345
Patented Aug. 4, 1959

2,898,345
SYNTHESIS OF SUBSTITUTED SUCCINYL COMPOUNDS

Robert Y. Heisler and Alfred J. Millendorf, Fishkill, N.Y., assignors to Texaco Inc., a corporation of Delaware No Drawing. Application February 17, 1956
Serial No. 566,087

4 Claims. (Cl. 260—326.5)

This invention relates to synthesis of substituted succinyl compounds and more particularly to a process for preparation of such compounds by carbonylation of certain unsaturated organic acid amides.

In the copending application of Bernard F. Crowe and Robert Y. Heisler, Serial No. 463,594, filed on October 20, 1954, entitled "Synthesis of Substituted Succinyl Compounds," it was shown that unsaturated carboxylic acids having at least five carbon atoms and a carbon-to-carbon double bond separated from the carboxyl group by at least a pair of methylene groups are convertible by carbonylation into substituted succinyl compounds, which have a carboxyl group on each of a pair of adjacent carbon atoms. Thus, in that process the organic acid is carbonylated with carbon monoxide and a primary or a secondary amine, e.g. an aryl, alkyl or heterocyclic amine. The nitrogenated dicarbonyl materials so formed can be hydrolized readily to yield corresponding substituted succinic acids.

The instant process is an improvement in the process of S.N. 463,594 whereby dramatically increased yield is obtained. Broadly, this improvement comprises carbonylating, with carbon monoxide in the presence of a primary or seconlary amine, an N-hydrocarbyl amide of the acid used in S.N. 463,594 in place of the acid itself. Advantageously the amine used is the same as that used in forming the amide. A particular aspect of our improved process comprises reacting an N-hydrocarbyl amide of a carboxylic acid of the acrylic acid series $(C_nH_{2n-2}O_2)$ wherein the olefinic carbon-to-carbon bond is displaced by at least two methylene radicals from the carbonyl group with carbon monoxide at a temperature of 250–600° F. in the presence of a cobalt carbonylation catalyst and an amine having at least one hydrogen atom attached to the amino nitrogen atom; the nitrogenated dibarbonyl material formed thereby, i.e. the imide or diamide of a substituted succinic acid, is then subjected to hydrolysis conditions with water and a hydrolysis catalyst, e.g. an alkali metal hydroxide or a strong mineral acid, at elevated temperature, to split off amine and produce the substituted succinic acid. By use of the N-hydrocarbyl amide of the carboxylic acid for the reaction instead of the corresponding acid the yield of succinyl compound obtainable is surprisingly increased, e.g. 80% based on the oleic acid anilide when charged with aniline as compared to less than 50% based on oleic acid itself when charged with aniline according to the process of S.N. 463,594.

The necessary amides for our process can be formed by reaction of an amine with a suitable carboxylic acid. For our use the amides are preformed, then carbonylated. Such acids can be represented generically by the formula LCH:CH(CH$_2$)$_n$COOH, where $n$ is an integer of at least two and L stands for the hydrogen atom, or a hydrocarbyl radical, i.e. an organic radical composed solely of carbon and hydrogen, or a hydrocarbyl radical containing in place of some hydrogen therein one or more substituent groups which modify the carboxylic acid only to the extent that the negative logarithm of the acid dissociation constant, pK$_a$ at 25° C., remains in the range from about 3 to about 6. Thus, the groups such as alkoxy, halogen, mercapto, carbonitrile, amido, nitro, thioester and hydroxy are included among the conceivable substituents for hydrogen in the radical L.

In the above representation the radical L can be: aliphatic e.g. a straight or branched chain or cyclic radical having empirical formula $C_mH_{2m+1}$ (i.e. alkyl), or $C_mH_{2m-1}$ (i.e. alkenyl and cycloalkyl), or $C_mH_{2m-3}$ (i.e. alkynyl and cycloalkenyl), or alkapolyenyl such as alkadienyl or alkatrienyl; also aromatic, e.g. phenyl, biphenylyl, naphthyl, benzyl, or tolyl; or one of the above hydrocarbyl radical types wherein one or more hydrogen atoms is replaced by a substituent group such as those described hereinbefore.

For efficiency and economy in the practice of our invention amides of carboxylic acids having the following structure are preferred: the radical represented by the letter L in the above formula is hydrogen or alkyl of 1–15 carbon atoms and the number of methylene groups represented by the subscript $n$ is from 2–12. Use of such amides reduces the likelihood of substantial polymerization in the reaction mixture or multiple carbonylation as might occur when the radical reprsented by the letter L in the above formula is alkenyl or alkynyl.

A representative but not exhaustive compilation of preferred carboxylic acids suitable for forming amides useful in our process is:

oleic, $C_8H_{17}CH:CH(CH_2)_7COOH$
9,10 undecylenic, $CH_2:CH(CH_2)_8COOH$
8,9 undecylenic, $CH_3CH:CH(CH_2)_7COOH$
brassidic, $C_8H_{17}CH:CHC_{11}H_{22}COOH$
4-pentenoic, $CH_2:CH(CH_2)_2COOH$
myristolenic, $CH_3C_4H_9CH:CH(CH_2)_7COOH$
palmitoleic, $C_6H_{13}CH:CH(CH_2)_7COOH$
5-hexenoic, $CH_2:CH(CH_2)_3COOH$
6-heptenoic, $CH_2:CH(CH_2)_4COOH$
7-octenoic, $CH_2:CH(CH_2)_5COOH$
8-nonenoic, $CH_2:CH(CH_2)_6COOH$
9-decylenic, $CH_2:CH(CH_2)_7COOH$
9-dodecylenic, $CH_3CH_2CH:CH(CH_2)_7COOH$
petroselinic, $CH_3(CH_2)_{10}CH:CH(CH_2)_4COOH$
vaccenic, $CH_3(CH_2)_5CH:CH(CH_2)_9COOH$
gladoleic, $CH_3(CH_2)_9CH:CH(CH_2)_7COOH$; and
cetoleic, $CH_3(CH_2)_9CH:CH(CH_2)_9COOH$ The amines useful for forming the required amide and also for mixing into the carbonylation reaction mixture are basically reacting and can be either primary or secondary. From our experimental work it appears that the invention process is specific to such amines and that ammonia does not produce a similar reaction. The formula of suitable primary amines for the practice of our invention can be represented as RNH$_2$ where R is a monovalent organic radical. The formula of suitable secondary amines for the practice of our invention can be represented by the formula RR'NH, where R and R' are linked to form a single divalent radical, e.g. as in the compound piperidine (pentamethyleneimine), or they are the same or different distinct monovalent organic radicals. The organic radicals R and R' in the above amine formulae can be hydrocarbyl or substituted hydrocarbyl having in place of some hydrogen therein one or more substituent groups which modify the amine only to the extent that the negative logarithm of the basic dissociation constant, pK$_b$, remains in the range from about 3 to about 10. Thus, the groups such as alkoxy, halogen, mercapto, carbonitrile, amido, nitro, thioester and hydroxy are included among the conceivable substituents for hydrogen in the radicals R and R'.

Suitable organic radicals represented by the symbols

R and R' in the above amine formulae can be: aliphatic, e.g. straight or branch chain alkyl, alkenyl, alkapolyenyl or alkynyl, advantageously a saturated $C_5$ to $C_{12}$ radical; aromatic, e.g. phenyl, biphenylyl and naphthyl benzyl, and tolyl; alicyclic, e.g. cyclohexyl, cyclopentadienyl, cycloheptyl and cyclohexenyl; heterocyclic, e.g. furyl, furfuryl and pyranyl. Representative types of amines especially suitable for mixing into the carbonylation reaction mixture to obtain highest yields are aniline and a toluidine. Preferably, for efficiency and economy in the practice of our invention, the amide used is an aromatic amide, the reaction product of a primary aromatic amine such as aniline or a toluidine with the particular organic acid; alternatively, amides from the reaction of the particular organic acid with a secondary amine can be used if desired. When the amine in the carbonylation mixture is the same as that used for the amide formation, recovery processing after hydrolysis is the simplest, and thus is preferred.

The possibilities of this synthesis are quite extensive. The following equations represent general reaction types obtainable with our process wherein the letters R, R', R'', and R''' represent hydrocarbyl radicals, the letter L hydrogen or a hydrocarbyl radical, and $n$ an integer of two or more.

(1)
$$L CH:CH(CH_2)_n\overset{O}{\underset{\|}{C}}-NHR'' + CO \xrightarrow[\text{(cat.)}]{RNH_2}$$
N—monohydrocarbyl amide    carbon monoxide    primary amine

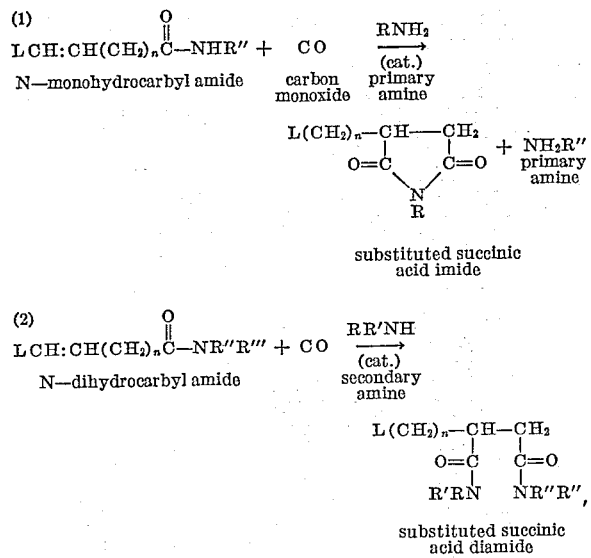

substituted succinic acid imide (2)
$$L CH:CH(CH_2)_n\overset{O}{\underset{\|}{C}}-NR''R''' + CO \xrightarrow[\text{(cat.)}]{RR'NH}$$
N—dihydrocarbyl amide    secondary amine substituted succinic acid diamide From the above equations it can be seen that, for formation of the substituted succinic acid diamide, one mol of free amine be present in the carbonylation reaction mixture, but that substituted succinic acid imide formation can proceed with only a small amount of free amine in the carbonylation reaction mixture. For making the imide at least about 0.1 mol of free amine per mol of amide reactant is desirable. From our experimental work we have noted that free amine is necessary for conducting the reaction. Preferably, whether making the substituted succinic acid imide or diamide, at least a mol of free amine is charged to the carbonylation reactor per mol of amide reactant to obtain best rate and yield.

Actually we have found that a small amount of substituted succinic acid diamide is produced when reacting to obtain the corresponding imide. However, as hydrolysis of such impure product mixture produces the same substituted succinic acid from either nitrogenated material, the presence of by-product diamide in such case is unobjectionable.

In further amplification of our invention, the following specific carbonylation cases are shown. When the amide reactant is undecylenic acid anilide and the amine present is aniline, there is obtained N-phenyl octyl succinimide,

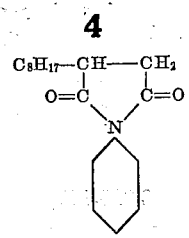

and free aniline.

When the amide reactant is oleic acid p-toluide and the amine present is p-toluidine, there is obtained the N-paratolyl imide of pentadecyl succinic acid,

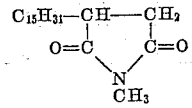

and free p-toluidine.

When the amide reactant is the reaction product of piperidine with oleic acid and the amine present is piperidine, there is obtained the pentamethylene diamide of pentadecyl succinic acid,

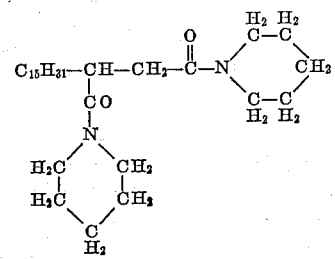

The substituted succinic acid corresponding to the above-described imide and diamide products can be made, for example, by alkaline hydrolysis of the nitrogen-containing reaction product followed by acidification; or, alternatively, by acid hydrolysis of the nitrogen-containing reaction product. The substituted succinic acid can be converted into a variety of corresponding materials using conventional techniques, e.g. into an anhydride by treating with acetic anhydride, or into an ester by treating with an alcohol in the presence of a suitable catalyst. For efficiency and economy for the practice of our process, it is preferred to hydrolyze the nitrogenated reaction products and recover the substituted succinic acids by crystallization from solvents such as acetone or lower alkanols. After hydrolysis a substantial amount of the amine used in the carbonylation reaction and also in the amide formation can be recovered, e.g. by distillation. The substituted succinic acids obtainable by our process are useful for corrosion inhibition is hydrocarbon oils.

Preferably the catalyst used in our process is a cobalt carbonyl in concentration of about 0.1 to about 5 weight percent based on the weight of the reaction mixture. Alternatively, a cobalt compound convertible to dicobalt octacarbonyl and/or cobalt hydrocarbonyl under conditions of the carbonylation, e.g. cobalt carbonate or cobalt naphthenate, can be used.

To dissolve components of the reaction mixture and to make the mixture easier to handle it is sometimes of advantage to employ a relatively low-boiling diluent, e.g. a hydrocarbon such as pentane or toluene. Amount of diluent used is suitably from about 500 to about 1000 ml. per gram mol of the carboxylic acid charged, and preferably about 800 ml. per gram mol.

Elevated pressures are advantageous in the reaction, e.g. above 1000 p.s.i.g. Preferably the pressure employed is from about 3000 to about 9000 p.s.i.g., and especially preferred is pressure from 3000–5000 p.s.i.g. Temperature should be at least 250° F. to obtain substantial reaction rate. Preferred temperatures are between 300° and 500° F. and especially about 400° F. Use of temperature substantially above 600° F. is likely to cause secondary reactions to an undesirable extent. The carbon monoxide used in the carbonylation reaction is preferably of high purity, but it also can be diluted with inert gases such as nitrogen or argon if desired.

Batch carbonylation appears to be the most economical and versatile carbonylation technique for manufacture of small quantities of these succinyl compounds; but, where demand warrants it, continuous or semicontinuous techniques on the order of those proposed for aldehyde production from olefins, carbon monoxide and hydrogen can be adapted for use in our process.

Suitable materials of construction for the carbonylation reactor are glass-lined steel, silver-lined steel, or a high alloy stainless steel such as American Iron and Steel Institute Standard Type No. 410.

The following data demonstrate the excellent yield obtainable by use of our improved process: Oleic acid anilide was prepared by heating an equimolecular mixture of oleic acid and aniline for two hours in a manner so as to distill off water, commencing at 374° F. and concluding at 437° F. to drive off the last of the water traces. The mixture was then cooled, 0.72 mol of additional aniline added, and the process repeated. After all the water had distilled off, the contents of the reactor were cooled and the excess aniline removed by distillation under total pressure of 100 mm. Hg. The liquid residue after cooling was treated successively with 1 N aqueous hydrochloric acid, water, 1 N aqueous sodium hydroxide, and twice more with water. The residue, then solid, was filtered off, dried and crystallized from methanol. The crystalline product and certain fractions recovered from distillation of the filtrate were combined, then redistilled to give an oleic acid anilide fraction having boiling point of 482–510.8° F. at 3 mm. Hg.

A mixture of 0.665 mol of the above-prepared oleic acid anilide, 0.665 mol aniline, and cobalt carbonyl catalyst in concentration of 0.665 weight percent based on the weight of the mixture was subjected to 4339 p.s.i.g. carbon monoxide pressure in an agitated stainless steel reactor for four hours with average temperature maintained at 404° F. After this period carbon monoxide absorption was no longer apparent as evinced by pressure in the reactor subsiding to a constant value about 550 p.s.i. below initial pressure. The reactor was then cooled to room temperature and vented of gas.

The reaction product, a brown solid, was mixed with heptane and activated carbon, the vehicle heated to boiling, and the mixture filtered. The heptane filtrate was chilled to 32° F., and a white solid which precipitated was separated by filtration and dried. A small portion of this material was recrystallized from isopropanol to give a white solid identified as pentadecyl succinimide ($C_{25}H_{39}O_2N$) having M.P. of 71.2–72° C. and assaying in weight percent as 77.4% C, 10.0% H, and 4.32% N as compared to the calculated analysis of 77.8% C, 10.1% H, and 3.64% N. Various other crystalline fractions were recovered, one of them yielding about 1% of pentadecyl succinic acid dianilide, $C_{31}H_{46}O_2N_2$, based on oleic acid anilide charged. Overall yield of the imide and diamide, based on the oleic acid anilide charged, was 80.5%.

Both the major imide and the minor amide products of this reaction, when subjected to hydrolysis conditions, e.g. with aqueous 10% potassium hydroxide, using average temperature of 660° F., average nitrogen pressure of 250 p.s.i.g., and reaction time of four hours followed by acidification with dilute sulfuric acid, yield pentadecyl succinic acid practically quantitatively. Alternatively, the imide and amide products can be hydrolyzed with aqueous 50% sulfuric acid at temperature of 284° F. to yield pentadecyl succinic acid. The pentadecyl succinic acid can be isolated from the hydrolysis reaction mixture using conventional recrystallization procedures from solvents such as acetone or methanol.

Obviously, many modifications and variations of the invention, as hereinbefore set forth, may be made without departing from the spirit and scope thereof, and therefore only such limitations should be imposed as are indicated in the appended claims.

We claim:
1. In a process for producing a substituted succinyl compound from a monocarboxylic acid of the acrylic acid series wherein the olefinic carbon-to-carbon bond is displaced by at least two methylene radicals from the carboxyl group, the improvement for increasing yield of said succinyl compound which comprises: preforming an amide of said acid by reacting it with an amide of 5–12 carbon atoms, said amine having at least one hydrogen atom attached to the amino nitrogen atom, and thereafter carbonylating the resulting amide with carbon monoxide at temperature of 250–600° F. and pressure above 1000 p.s.i.g. in the presence of an additional quantity of said amine and a cobalt carbonylation catalyst.

2. The process of claim 1 wherein the amide is formed from a primary aromatic amine, and the carboxylic acid has 5 to 30 carbon atoms.

3. The process of claim 1 wherein the product succinyl compound is converted into the corresponding substituted succinic acid by subjecting it to hydrolysis conditions with water and a hydrolysis catalyst at elevated temperature.

4. The process of claim 1 wherein the amide used is oleic acid anilide, and the amine used is aniline.

References Cited in the file of this patent
UNITED STATES PATENTS

| | | |
|---|---|---|
| 2,542,766 | Gresham | Feb. 20, 1951 |
| 2,648,685 | Reppe et al. | Aug. 11, 1953 |

FOREIGN PATENTS

| | | |
|---|---|---|
| 628,659 | Great Britain | Sept. 1, 1949 |

UNITED STATES PATENT OFFICE
Certificate of Correction

Patent No. 2,898,345　　　　　　　　　　　　　　　　　August 4, 1959

Robert Y. Heisler et al.

It is hereby certified that error appears in the printed specification of the above numbered patent requiring correction and that the said Letters Patent should read as corrected below.

Column 1, line 38, for "seconlary" read —secondary—; column 3, lines 46 and 47, for $\overset{|}{N}R''R''$ read $\overset{|}{N}R''R'''$ column 4, lines 14 to 17, the formula should appear as shown below instead of as in the patent:

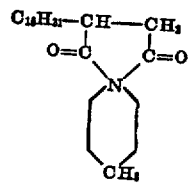

same column 4, line 52, for "is" read —in—; column 6, line 31, for "amide", second occurrence, read —amine—.

Signed and sealed this 19th day of January 1960.

[SEAL]

Attest:
KARL H. AXLINE,
*Attesting Officer.*

ROBERT C. WATSON,
*Commissioner of Patents.*